United States Patent [19]

Lampert

[11] Patent Number: 4,736,642

[45] Date of Patent: Apr. 12, 1988

[54] FRICTION-WHEEL TORQUE CONVERTER

[75] Inventor: Heinz Lampert, Buchs, Switzerland

[73] Assignee: Delta AG, Switzerland

[21] Appl. No.: 865,204

[22] PCT Filed: Sep. 5, 1985

[86] PCT No.: PCT/CH85/00128

§ 371 Date: May 2, 1986

§ 102(e) Date: May 2, 1986

[87] PCT Pub. No.: WO86/01572

PCT Pub. Date: Mar. 13, 1986

[30] Foreign Application Priority Data

Sep. 6, 1984 [CH] Switzerland ............... 4248/84

[51] Int. Cl.⁴ .................................... F16H 15/26
[52] U.S. Cl. .................................... 74/194; 74/190.5; 74/207; 74/208
[58] Field of Search ............... 74/191, 194, 198, 196, 74/199, 190, 190.5, 207, 208, 209, 197

[56] References Cited

U.S. PATENT DOCUMENTS

| | | | |
|---|---|---|---|
| 1,408,748 | 3/1922 | Lafitte | 74/199 |
| 2,209,878 | 7/1940 | Flender | |
| 2,498,012 | 2/1950 | Sjastrand | 74/197 X |
| 2,617,309 | 11/1952 | Casson et al. | 74/194 |
| 2,961,899 | 11/1960 | Grove et al. | 74/191 |
| 4,024,771 | 5/1977 | Joseph | 74/198 |
| 4,062,284 | 12/1977 | Shiokawa | 74/197 X |
| 4,109,541 | 8/1978 | Jesse | 74/194 |
| 4,112,781 | 9/1978 | Baugh | 74/198 |
| 4,210,032 | 7/1980 | Lampert | 74/190.5 |
| 4,651,378 | 3/1987 | Seron et al. | 74/194 X |

FOREIGN PATENT DOCUMENTS

| | | |
|---|---|---|
| 0038462 | 10/1981 | European Pat. Off. |
| 610144 | 5/1933 | Fed. Rep. of Germany |
| 866292 | 12/1952 | Fed. Rep. of Germany |
| 837117 | 2/1939 | France |
| 881592 | 4/1943 | France |
| 885314 | 9/1943 | France |
| 1303145 | 7/1961 | France |
| 1526650 | 5/1968 | France |
| 2187067 | 1/1974 | France |
| 8095273 | 10/1973 | Japan |
| 477092 | 12/1937 | United Kingdom |
| 763514 | 12/1956 | United Kingdom |
| 827608 | 2/1960 | United Kingdom |

OTHER PUBLICATIONS

Simonis Getrieve, 2. Auflange, Seite 15, 1959.

Primary Examiner—Randolph A. Reese
Assistant Examiner—Peter M. Cuomo
Attorney, Agent, or Firm—Ostrolenk, Faber, Gerb & Soffen

[57] ABSTRACT

The automatic friction wheel torque converter enables a bearing-free adjustable force transmission, with different loads and speeds, for example in electric vehicles or machines. Said converter is simple, economical and has a high efficiency. It comprises a pair of friction wheels of which one (8) has a conical annular part and the other one a planar disk (11), a device (5) enabling to move one of the wheels with respect to the other one. Said device is articulated about an axis (16) arranged parallel to the disk and to the cone generatrix of the annular part where said annular part engages said disk. The planar disk may be replaced by a driven cone, in which case the axis (16) is parallel to a generatrix of said driven cone. Elastic members acting on an oscillating frame (2) enable a large number of applications.

35 Claims, 5 Drawing Sheets

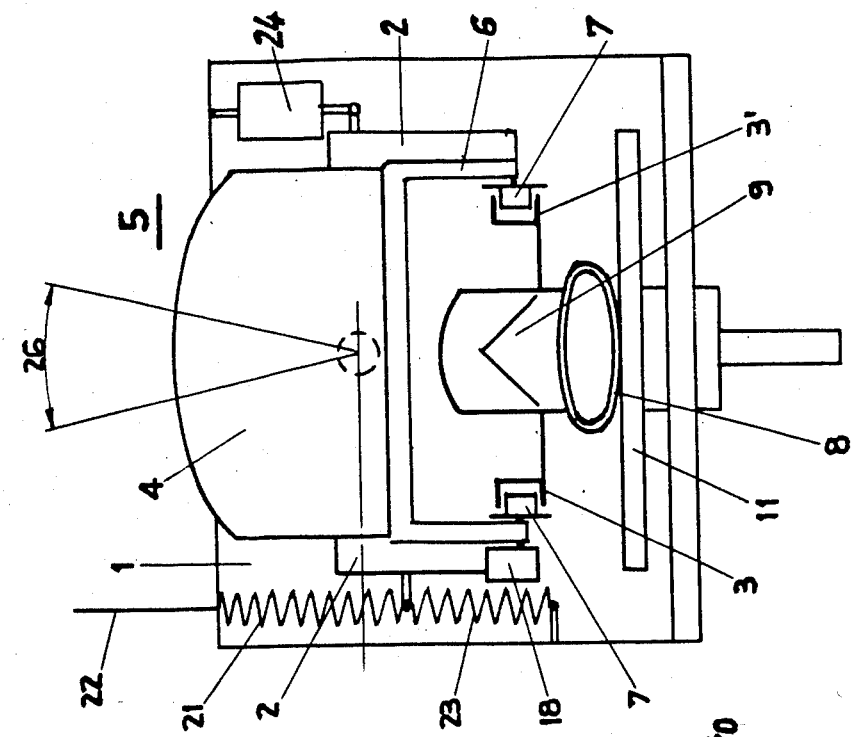
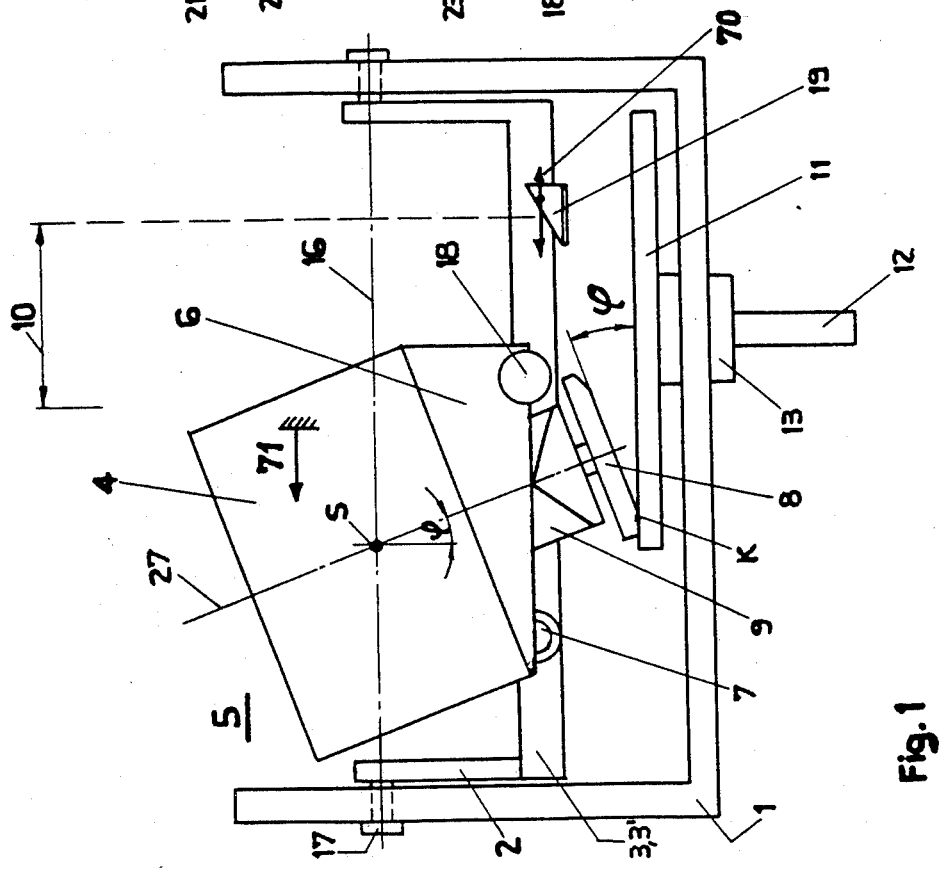

FRICTION-WHEEL TORQUE CONVERTER

BACKGROUND OF THE INVENTION

The present invention concerns a friction-wheel torque converter for the infinitely variable, automatic transmission of force, having a pair of friction wheels, comprising an annular friction wheel and a driven cone with a displacement device.

Such torque converters are suitable for drives or else for generators with which different loads with different speeds occur in operation. This is the case, for instance, of electric motor-cars. Here frequently electronic speed controls are used which, however, cannot effect torque conversion. In automobiles, gear transmissions or infinitely variable hydraulic converters are therefore used. All of these known solutions, however, have considerable disadvantages. Either there is no torque conversion or the converters are expensive and costly, or else they have high losses.

SUMMARY OF THE INVENTION

The object of the present invention is, accordingly, to provide a simple, inexpensive friction-wheel torque converter which automatically adjusts the transmission ratio continuously in accordance with the instantaneous moment of the load and is of high efficiency.

This object is achieved, in accordance with the invention, in the manner that this displacement device has as a movable part, in addition to the friction wheel, a pressing device, a drive, a rocker arm and a carriage, the displacement device being turnably mounted around a swing axis and said swing axis being arranged substantially parallel to a generatrix of the driven cone, and that at least one force transmission element acts on the rocker arm.

BRIEF DESCRIPTION OF THE DRAWINGS

The invention will be explained by way of example below with reference to the drawings, in which:

FIG. 1 shows one embodiment of the invention, seen from the front;

FIG. 2 is a side view of the embodiment of FIG. 1;

DETAILED DESCRIPTION

Figure 3:
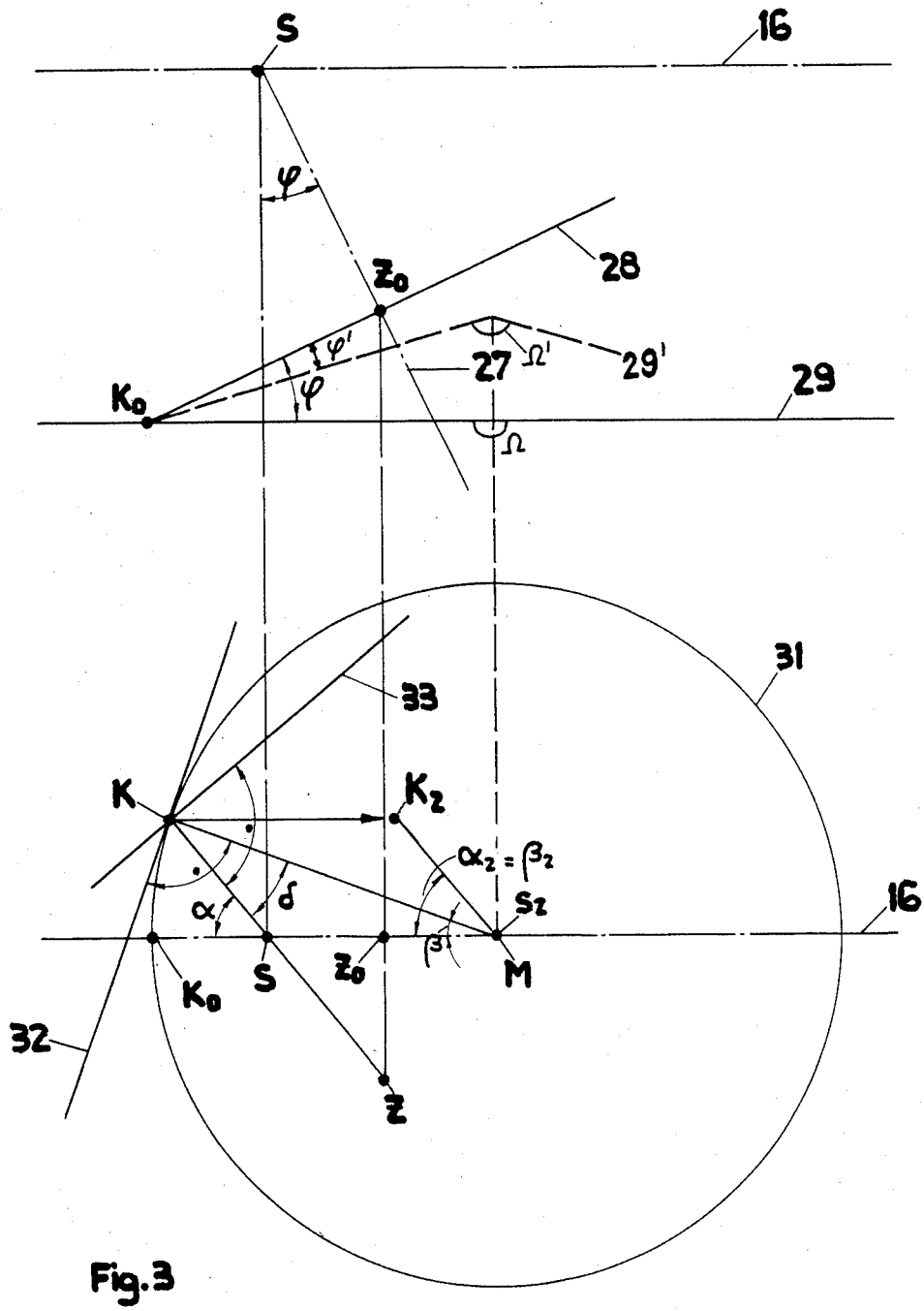
FIG. 3 is a diagram showing the manner of action.

The embodiment of FIG. 1 shows a friction-wheel torque converter having a housing 1 within which a rocker arm 2 is turnably mounted in a bearing 17. This may be a double-side bearing as shown in the drawing or else a single-side bearing. A drive, in this case a motor 4, having a drive axis 27 is fastened on a carriage 6. This carriage 6 travels on two guide rails 3, 3' of the rocker arm 2, for instance via rollers 7. The motor shaft bears an annular friction wheel 8 which is guided displaceably, via a pressing device 9, axially to the drive axis 27. The friction wheel 8 drives a driven cone, developed in this embodiment as a friction-wheel 11 having a control surface engaging the friction-wheel 8, the driven friction-wheel 11 being referred to herein as the driven disk 11, and having a secondary shaft 12 which is mounted in the housing 1 by a bearing 13. Development of the driven cone with a cone angle of 180°, as a flat disk 11, is particularly simple. Said bearing 13 comprises, for instance, a double-row angular-contact ball bearing. From this secondary shaft 12, an electric motor car or machine for instance can then be driven. The displacement apparatus 5 consists of the movable part, that is of the movable elements noted above, namely the rocker arm 2, drive motor 4, carriage 6, pressing device 9 and friction wheel 8.

The present friction-wheel torque converter, however, also operates in the reverse direction, in the manner, for instance, that the secondary shaft 12 is driven and a generator is provided instead of the drive or motor 4. By means of suitable dc motors 4 it is also possible in this way to provide a recuperative brake in the case of electric motorcars. In such case, the kinetic energy of the electric motorcar, which kinetic energy is to be destroyed, drives this motor 4 as a generator, which thereby feeds current back into the drive batteries. The swing axis 16, around which the rocker arm 2 can be swung or deflected, preferably passes through the center of gravity S of the displacement apparatus 5, i.e. of the movable unit comprising the motor, carriage, rocker arm, pressing device and friction wheel. The swing axis 16 and the linear roller guidance, including guide rails 3, 3' and the rollers 7 are substantially parallel to the plane of the driven disk 11 or in general to a generatrix of the driven cone.

Instead of a motor $p$ which is rigidly attached to the movable carriage, the apparatus according to the invention can also be developed with a stationary motor located on the outside, for instance by transmission of power from this stationary external motor to a movable carriage housing 6 by means of a flexible shaft or spline shaft as drive shaft—which in this case corresponds to the drive motor 4. This carriage housing is then again similarly guided linearly and parallel to the driven disk 11 on a turnable rocker arm 2.

The angle of inclination 4 between drive shaft 27 and secondary shaft 12 is in this case equal to the angle $\rho$ between friction wheel 8 and driven disk 11. In general, the angle $\rho'$ between friction wheel 8 and driven cone 11 (shown in dashed line in FIG. 3) is smaller than the angle of inclination $\rho$. With the cone angle of the driven cone, $\Omega$ or $\Omega'$, an additional parameter is introduced which can be optimized, depending on the use, together with the other geometrical variables.

Thus, for instance, with an angle of inclination $\Omega$ of 10°, $\rho'$ can be reduced to 2° by reducing the cone angle of the driven cone from $\Omega = 180°$ to $\Omega' = 164°$.

FIG. 2 shows the same apparatus seen from the side (the right side in FIG. 1), with the front plate of the housing 1 removed. Thus there are visible the two guide rails 3 and 3' in which, in this case, two rollers 7 with single flange at both ends of the carriage travel. These wheels 7 are fastened to the carriage 6 by means of an adjustable axle screw. Two springs act as force-transmission elements on the rocker arm 2, namely the tensioning spring 21 which passes, for instance, into a gas cable 22, and the opposing or recuperation spring 23, which in this case is fastened to the housing 1.

By adjusting the force of the force transmission element, such as the spring shown, on the rocker arm 2, different types of operation can be realized or controlled, such as continuous acceleration and deceleration, by displacement of the force in both directions, and thus of the motor current in both polarities with respect to the motor feed voltage. However, discrete, fixed power-consumption or delivery values can also be set.

A shock absorber or dashpot 24 is also provided between rocker arm 2 and housing 1. This shock absorber is preferably double-acting, compact and adjustable. It thus also limits the region of swing 26 of the movable unit consisting of rocker arm 2, carriage 6, friction wheel 8 and motor 4. It is not always necessary to provide a hydraulic shock absorber, and frequently a simple frictional damper, inertia damper or stops of damping action which limit the range of swing of the rocker arm is sufficient. On the outside of the carriage there is provided here an end-position roller 18 which at the end of the adjustment range 10 strikes against an end-position wedge 19 (FIG. 1). As will be explained below, the carriage is brought by these end-position elements 18, 19 into the neutral position and the displacement force which has pushed the carriage up against the stop is eliminated.

The manner of operation of the automatic control, i.e. of the displacement within the control range, will be explained with reference to FIG. 3. In the neutral position, if the transmission ratio is not changed, the contact point $K_o$, at which the friction-wheel plane 28 is in contact with the driven disk 29 or the driven cone 29', is vertically below the swing axis 16, in the same way as the center $Z_o$ of the friction wheel plane. If the carriage 6, together with the motor and friction wheel, is now swung around the swing axis 16 then the point of contact $K_o$ moves along the circle of movement 31 of the driven disk to the point K. At the same time, the center $Z_o$ of the friction wheel moves to the point Z, the center of swing S, however, of course remaining at the same place. Here there is produced a skew angle (also known as displacement angle or control angle) between the direction of travel 32 on the friction disk and the direction of travel 33 of the friction wheel, i.e. between the tangents to the corresponding circles of the path of movement Z and M of friction wheel and driven disk. To a deflection angle $\alpha$ on the driven disk there corresponds, in this connection, a path angle $\beta$ for the friction wheel. For the skew angle $\delta$ we then have $\delta = \alpha - \beta$. This skew angle effects a displacement of the carriage in the direction of the center of the disk up to the contact point $K_2$. Here we have $\delta = 0$ since deflection angle $\alpha_2$ and path angle $\beta_2$ have become identical since the center of gravity $S_2$ coincides with the center M of the driven disk. Thus, the end of the displacement range, the so-called neutral point N, is reached.

It can also be noted that the control angle or skew angle $\delta$ increases with an increase in the deflection angle $\alpha$, i.e. with an increase in the swing of the carriage 6 or an increase in the force of the tensioning spring 21, effected, for instance, via a gas pedal. In this way, the control speed increases and a higher drift component can also be controlled. The statements made above apply without consideration of the drift which always occurs, similar to an automobile tire along a curve, in actual friction pairings. There is then produced a drift angle $\gamma$ which increases with the skew force and reduces the effective skew angle $\gamma$. Taking the drift into account we then have $\gamma = \alpha - \gamma - \beta$. An increase in the drift angle $\gamma$ must therefore be counteracted by increased deflection $\alpha$ or increased giving of gas on the spring 21 in order to obtain the same skew angle $\delta$. With the occurrence of drift, the control limit N is also reached earlier since in such case, after all, $\alpha_2$ must be equal to $\beta_2 + \gamma_2$.

The angle of inclination $\rho$, which the friction wheel plane 28 and the driven plane 29 form, should preferably be small, less than 20°, for instance 5° to 15°. In order to achieve the optimum with respect to displacement geometry as well as more compact dimensions, the length of the motor and the position of the center of gravity of the movable unit should, of course, also be included in the optimalization.

Figure 4:
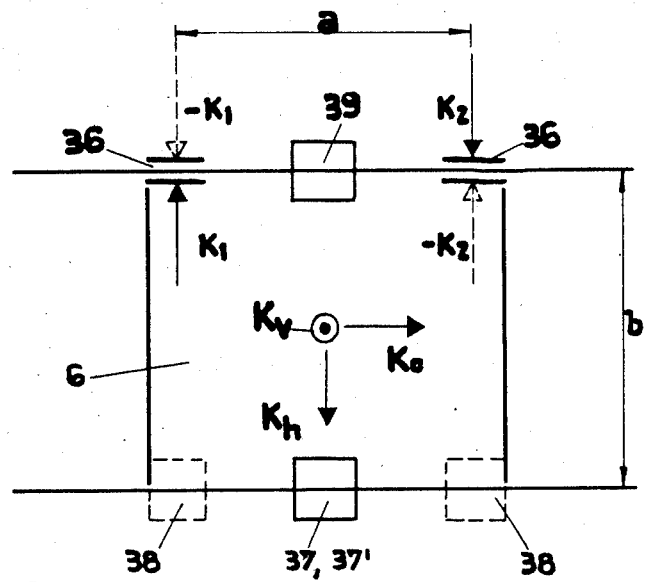
FIG. 4 is a diagram showing the carriage and the forces acting on it.

FIG. 4 shows a diagram of a carriage 6 and the forces which act on it and which must be taken up by the guide rails 3 and 3'. The drive moment of the motor produces the two forces $K_1$ and $K_2$ which, in this case act at the distance apart a on two wheels 36, each having two flanges, which travel on the guide rail 3.

Further horizontal forces $K_h$ present, or also reversed directions of force $-K_1$, $-K_2$ in the case of recuperative braking, can also be taken up by these wheels 36. In the case of the regulation, the skew produces a forward force $K_o$ which effects a displacement of the carriage. In order to obtain the easiest possible control, the entire frictional resistance of the carriage guidance should, of course, be small as compared with the control forces which occur. The friction wheel must be pressed against the friction disk by the drive device, which produces a vertical force $K_v$ on the carriage. This force is taken up here by upper rollers 37 and 39. In principle therefore, two lower guide rolls 36 as well as two upper support rolls 37 and 39 and an associated lower support roll 37' are sufficient.

However, various other embodiments are also conceivable, for instance four lower support and guide rollers 36 and 38 having only one flange, arranged on the corners of the carriage, as well as two upper cylindrical support rollers 37 and 39 which are, for instance, adjustable, so as to be able to obtain a desired minimum play. These support rollers 37 and 39 can also be additionally dampened by a rubber insert similar to a "silent block." The distance b between the guide rails 3, 3' is so selected that the forces and moments which occur can be favorably supported. An embodiment is particularly suitable which has two pairs of four rollers, at the bottom four track rollers of hard plastic, for instance Delrin, and the four simple slightly resilient or dampening opposing rollers, for instance of polyurethane elastomer.

Figures 5, 6:
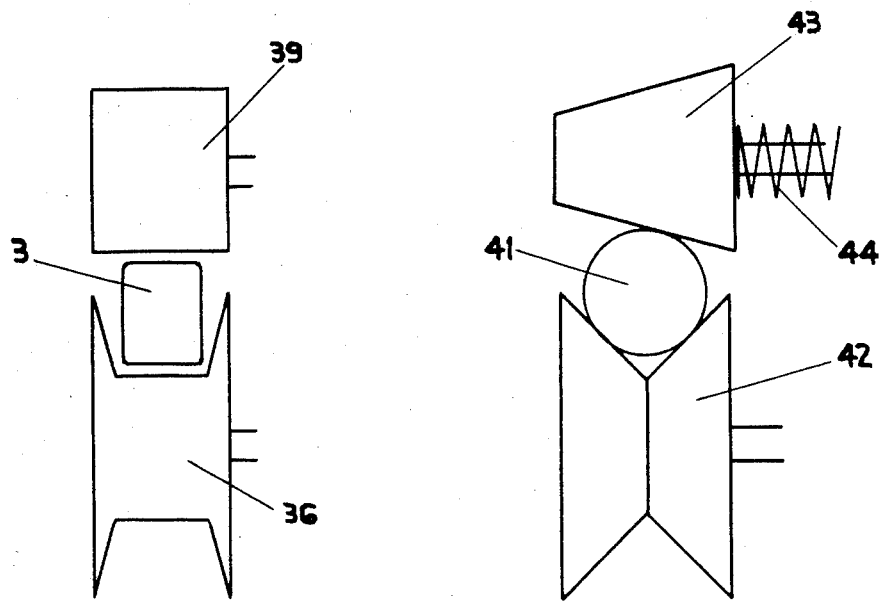
FIGS. 5 and 6 are embodiments of the guidance for the carriage.

FIG. 5 shows an arrangement with square pipes as guide rails 3 and 3', two carriage wheels 36 with double flange traveling on the rail 3, supplemented by a cylindrical support roller 39 on the opposite side. On the second rail 3' only cylindrical rollers without flange are then required. FIG. 6 shows another possible embodiment of the guidance of the carriage with the use of round bars 41 as guide rails and double-cone wheels 42 on the bottom, supplemented by ordinary cone wheels 43, which can be supplemented, for instance, by a compression spring 44 in order to take up the play. In principle, the guidance of the carriage could also be effected with ball boxes or with plain bearings, in which case, however, plain bearing elements of low coefficient of friction, for instance of teflon or oil sintered material, are necessary. Different embodiments of guide rails are also possible, such as round or polygonal pipes and profiled members of angular, T or U shape.

Figure 7:
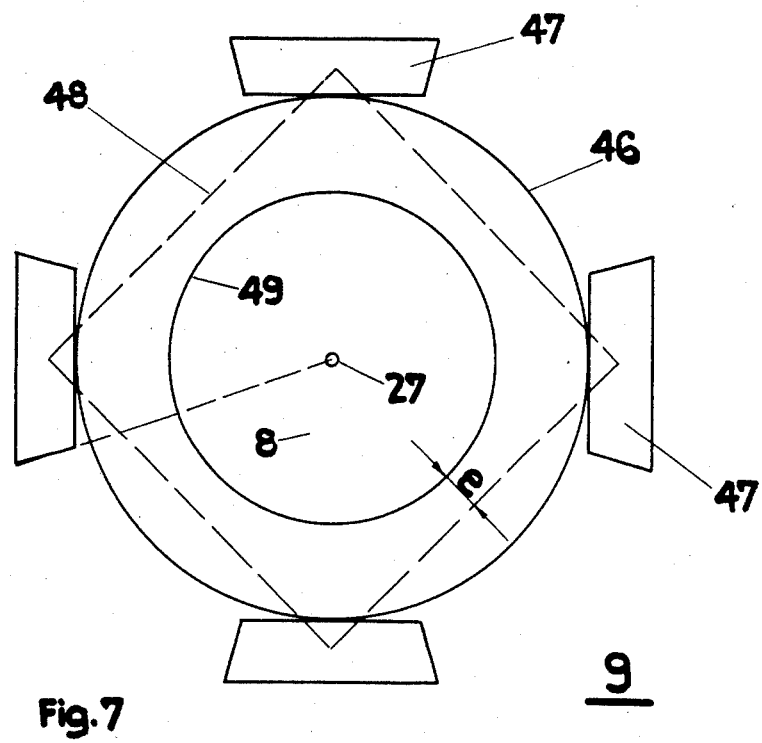
FIG. 7 shows a pressing device with wheels.

The pressing device 9 should produce a pressing force which can at all times just transfer the drive moment or the circumferential force on the friction wheel 8 proportional thereto without slippage, so that the pressing force is equal to the circumferential force divided by the coefficient of friction of the friction pairing. For this purpose, a small initial tension can be superimposed by means of an auxiliary spring. Such pressing devices can be developed by means of slide wedges. In this connection there is recommended a pair of low coefficient of friction, for instance of oil-sintered material of high resistance to temperature in view of the possible heating of the motor shaft. Slide wedges can then also be developed as bearing bushes which can also take over the axial guidance of the friction wheel on the motor shaft. A particularly advantageous thrust bearing has been developed with teflon-sintered bushings. In this connection, as shown in FIG. 7, there was selected a new pressing device with four equidistant pressing wheels 47 in which the quadratic connecting line 48 between the wheel engagement points of the pressing wheels (in general the bearing polygon) preferably completely surrounds the contact circle 49 of the friction wheel. The distance e between contact circle 49 and bearing polygon 48 is then therefore always positive. When the two intersect alternating loading is produced which may be accompanied by noise.

The pressing wheels 47 are borne by a mount 46 which is rigidly attached to the drive shaft 27. The friction wheel 8 is in this case mounted by a teflon-sintered bushing in tangentially and axially displaceable manner on the drive shaft. The pressing wheels 47 and the corresponding mating wedges present on the friction wheel 8 can be milled conically, corresponding to a pair of conical wheels.

In addition to metallic wheels, non-metallic, easily rolling pressing wheels can also be used, for instance of cotton material impregnated with phenol resin. In order to be able to counteract possible defects in roundness of the travel of the friction wheels, it is frequently advantageous to provide a certain spring action for the pressing, for instance by an auxiliary spring in the pressing device 9, by a slight natural resiliency of the motor suspension, or by the entire structural design. The requirements of slight resiliency or dampening of slight flexing work or slight turnability are satisfied by the purposeful use of different materials, for instance by metal lining on elastomer wheels, teflon bearing bushings and ball bearings. In this connection higher manufacturing tolerances and small amounts of dirt in the friction pair can also be permitted and handled. In the interest of good control properties, the friction covering, however, should not be too soft. As covering there can be used various brake and friction-wheel materials available on the market, as well, for instance, as polyurethanes or sintered coverings. In certain fields of use, quiet operation is necessary. In such case, noise-dampening elements can be provided, as described, on the pressing device and driven cone and on the driven disk by the application of a dampening sandwich of metal and elastic intermediate material.

If the limiting of the adjustment range is effected by simple stops skewing can occur there, resulting in extensive wear of the covering, frictional heat and corresponding losses of power. In order to avoid this, end-position elements are provided, which reset the deflection angle and/or the skew angle to zero, whereby the displacement force $K_o$ disappears and the neutral position is reached.

Figure 8:
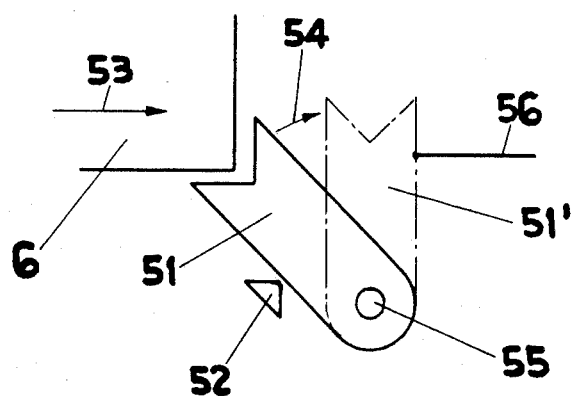
FIG. 8 shows an end-position lever as end-position return.

As shown in FIG. 1, this can be achieved by end-position rollers 18 which travel onto an end-position wedge 19. Another solution is represented by the end-position lever of FIG. 8. When the carriage 6 travels onto the end position lever 51 due to the adjustment force $K_o$ in the direction 53, said lever is turned in the direction 54 around a bearing 55 until the deflection, and thus also skewing and displacement force are counteracted. If a reversal of the flow of force is applied, for instance upon rearward travel or in case of recuperative braking, then rocker arm 2 and carriage 6 are deflected to the other side. In order to take this reversal into account, the end-position levers can be swung over, i.e. the lever 51 can be swung up, for instance, by a cable 56 and thus be disconnected, 51'. Similar to this, then, on the other side of the carriage, the end-position lever must be swung down against a stop 52 from its previous upper position. On the driving side, the shift to rearward travel is effected by reversing the polarity of the motor and, in principle, of the springs 23 and 21 of FIG. 1, i.e. the opposing spring 23 is now used as gas spring, actuated, for instance, by a second cable.

In certain applications it is desirable to introduce a variable or adjustable limitation of the speed of rotation. This can be done by displaceable end-position elements, as indicated in FIG. 1 by the arrows 70 on the end-position element 19. By continuous displacement, any desired maximum speed can be predetermined. If sufficient force is exerted on the rocker arm 2, this then acts as tempostat (time setter). Discrete positions can also be obtained, for instance position 1 with a range of variation of 1000 rpm to 4000 rpm, and position 2 from 1000 rpm to 2000 rpm, by means of a switch lever.

In certain practical cases, such as for restarting from the minimum position, it is essential that this can be achieved by means of return members which, after the disconnecting or before the reconnecting of the drive, bring the carriage into a predeterminable position. As indicated diagrammatically by the arrow 71 in FIG. 1, this can be done, with the use of a light spring, by the weight itself of the drive in the oblique position of the linear roller guide 3, 3' or by corresponding adjustment of the force transmission element.

Figure 9:
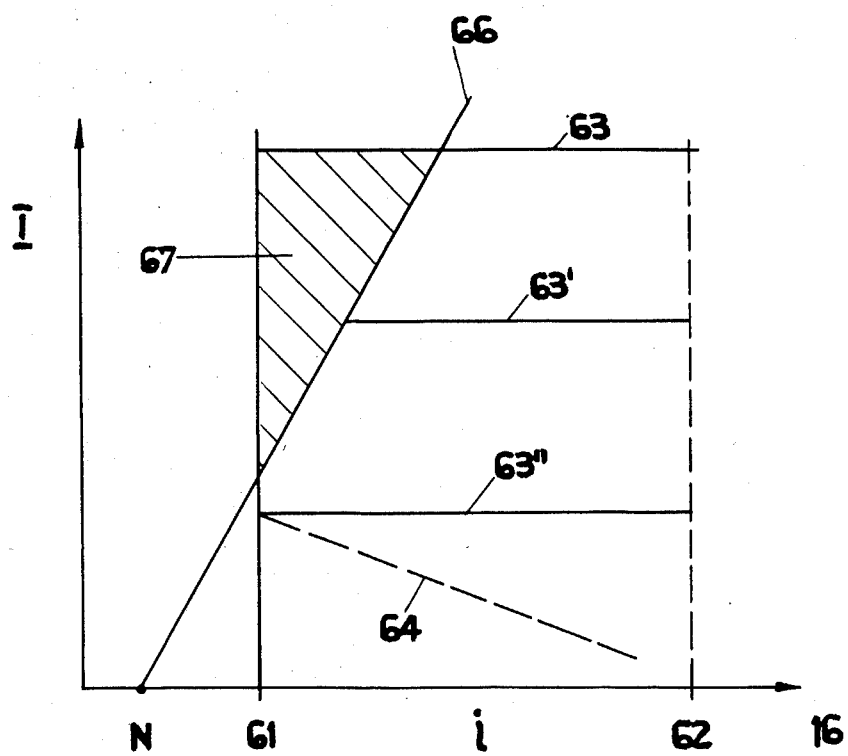
FIG. 9 is a diagram showing the control characteristic with drift control limit.

FIG. 9 shows the control characteristics obtained with the automatic friction-wheel torque converter of the invention. The control or variation range 61-62 is plotted on the displacement axis or swing axis 16. 61 and 62 form the lower and upper limits thereof. The transmission ratio i of the torque converter varies in this connection, for instance, from 0.4 to 1.6, which corresponds to a control range of 4:1.

N is the neutral point with $\alpha = \beta$ and therefore skew angle $\delta = 0$, in accordance with FIG. 3. The motor current I, and thus the power given off, is plotted on the ordinate. Depending on the current set, the control curves 63, 63', 63'' are obtained. A given infinitely adjustable gas position or pretensioning force of the spring 22 on the rocker arm 2 (FIG. 2) produces, in this connection, a corresponding constant current consumption I. The control curves 63 and 63' are limited here by the drift control limit 66; i.e. in this case we have $\alpha = \beta + \nu$ (the drift angle $\tau$ increases with I) and thus $\delta = 0$. In this way, a region 67 which cannot be passed over may result. By suitable optimizing of neutral point N and drift with respect to the control region 61, 62, this unavailable region 67 can, however, be made as small as desired.

If the swing axis 16 is placed somewhat eccentrically in the rocker arm 2 so that the swing axis 16 is no longer vertically above the center point M of the driven disk or the driven cone (as in FIG. 3), then other non-constant characteristics can be obtained, as is indicated by the line 64 in FIG. 9.

The force transmission elements 21, 22, 23 which act on the rocker arm 2 as well as the return members and setting members for the displaceable end-position elements can include, for the end stop, different mechanical springs such as tension, flexure or torsional springs. However, electrical, magnetic or pneumatic springs and setting elements can also be used.

Various embodiments of the other elements of the torque converter are also conceivable. For instance, housing parts can be made from bent sheet metal or from injection moldings of plastic or metal, or the carriage 6 can also be integrated with the motor housing, in the same way as, for instance, the friction wheel 8, including covering and pressing wedges, could be produced in a single piece by injection molding.

As example, with a torque converter of the invention in a compact, light and low-cost embodiment with a converter range of 4:1 with Bosch GPA 24 V motor, driven disk of nodular cast iron GGG 60 and suitable friction coverings (Beral, Derendinger, etc.) of a contact width of 4 mm, very good performances and control properties are obtained, including recuperability, with efficiencies of 90% and more.

The features of the invention which have been disclosed in the above specification, in the drawings and in the claims can be essential both individually and in suitable combinations, in order to reduce the invention to practice in its various embodiments.

What is claimed is:

1. A friction-wheel torque converter for the infinitely variable automatic transmission of force comprising:
   a driven friction wheel having generatrices; a first axle carrying said driven wheel;
   a driving friction wheel and a second axle carrying said driving wheel;
   said driving friction wheel and said driven friction wheel having respective surfaces which frictionally engage, said wheels being respectively shaped and their axles being so oriented that they engage over respective annular areas of said driving wheel and said driven wheel; and
   a movable support for said second axle; said support comprising a displacement device which is linearly movable substantially parallel to one of the generatrices of said driven friction wheel, said displacement device also being swingable around a swing axis substantially parallel to said generatrix.

2. The converter according to claim 1, wherein said swing axis and the axis of said second axle are disposed in one plane.

3. The converter of claim 1, wherein said swing axis and the axis of said second axle are disposed so that they do not cross each other.

4. The torque converter of claim 1, wherein said driven friction wheel is a degenerate cone having a cone angle of 180°.

5. The torque converter of claim 4, wherein said driving friction wheel meets said driven friction wheel at an angle of incline.

6. The torque converter of claim 1, further comprising linear guiding means parallel to said driven friction wheel generatrix on which said displacement device is linearly movable.

7. The torque converter of claim 6, wherein said displacement device comprises a carriage and said guiding means comprises roller means on said carriage and linear rail means for said roller means.

8. The torque converter of claim 1, further comprising force generating means swingably acting on said displacement device for controlling movement around said swing axis.

9. The torque converter of claim 8, wherein said force generating means is adjustable.

10. The torque converter of claim 9, wherein said force generating means comprises at least one adjustable spring means.

11. The torque converter of claim 9, wherein said force generating means comprises pretensioning spring means and opposing spring means and controlling means for operating at least one of said spring means.

12. The torque converter of claim 1, wherein said swing axis is arranged so as to pass through the center of gravity of said displacement device and said support.

13. The torque converter of claim 1, further comprising shock absorber means acting on said displacement device in at least one of the linear directions of movement and said swing movement directions for absorbing the motion.

14. The torque converter of claim 13, wherein said shock absorber means comprises double acting hydraulic shock absorber means.

15. The torque converter of claim 1, wherein said first axle and said second axle are inclined with respect to each other by an angle of at most 20°.

16. The torque converter of claim 15, wherein said angle of incline is between 5° and 15°.

17. The torque converter of claim 1, further comprising pressing means for pressing said driven friction wheel and said driving friction wheel toward each other.

18. The torque converter of claim 17, wherein said pressing means is for generating a pressing force which increases with a drive momentum transmitted via said pressing means.

19. The torque converter of claim 17, wherein said pressing means provides a biasing pressing force.

20. The torque converter of claim 17, wherein said pressing means is connected for acting on said driving friction-wheel and comprises at least three equidistant rolling means axially pressing on said driving friction-wheel.

21. The torque converter of claim 20, wherein said rolling means defines respective bearing areas rollably pressing toward said driving friction wheel, said bearing areas defining a polygon surrounding said annular areas.

22. The torque converter of claim 20, wherein said pressing means comprises at least one teflon-sintered bushing.

23. The torque converter of claim 20, wherein said pressing means comprises at least one oil sinter bearing.

24. The torque converter of claim 20, wherein said pressing means comprises at least one roller bearing.

25. The torque converter of claim 17, wherein said pressing means comprises pressing rollers made of a given material and having respective bearing rings thereon made of a different material from said given material.

26. The torque converter of claim 25, wherein said bearing rings are comprised of polyurethane.

27. The torque converter of claim 1, further comprising means for limiting the extent of linear movement of said displacement device in at least one direction.

28. The torque converter of claim 27, wherein said limiting means is formed by at least one stationery wedge and a roller on said displacement device.

29. The torque converter of claim 27, wherein said limiting means is displaceable selectively in discrete steps and continuously along said linear path of said displacement device.

30. The torque converter of claim 1, further comprising electric drive means mounted to one of said axles and further comprising control means for recuperative braking.

31. The torque converter of claim 1, further comprising noise-damping means on at least one of said driving friction wheel and said driven friction wheel.

32. The torque converter of claim 1, further comprising noise-damping means on said pressing means.

33. The torque converter of claim 1, further comprising controllable drive means acting on one of said driving friction wheel and driven friction wheel and means to bring said displacement device into a predetermined position as soon as said drive means is deactivated.

34. The torque converter of claim 1, further comprising drive means for driving one of said first axle and said second axle.

35. The torque converter of claim 1, further comprising drive means for driving said second axle.

* * * * *